Nov. 26, 1968 H. N. ESTERLY 3,413,623

CARD FILE STORAGE SYSTEM WITH METALLIC IDENTIFICATION MEMBERS

Filed March 11, 1966 2 Sheets-Sheet 1

INVENTOR.
HENRY N. ESTERLY

BY Robert Mednick

ATTORNEY

CARD FILE STORAGE SYSTEM WITH METALLIC IDENTIFICATION MEMBERS

Filed March 11, 1966 2 Sheets-Sheet 2

INVENTOR.
HENRY N. ESTERLY
BY Robert Mednick
ATTORNEY

United States Patent Office 3,413,623
Patented Nov. 26, 1968

3,413,623

CARD FILE STORAGE SYSTEM WITH METALLIC IDENTIFICATION MEMBERS

Henry N. Esterly, 22321 Cupertino Road, Cupertino, Calif. 95014
Filed Mar. 11, 1966, Ser. No. 533,476
8 Claims. (Cl. 340—174.1)

ABSTRACT OF THE DISCLOSURE

The file storage system includes spaced file items with metallic identification members, detector units responsive to the metallic members, and means to move the file items with respect to the detector units. Each detector unit includes a transducer head with a pair of coils in a circuit capable of oscillating, and each detector unit changes its state of operation after a metallic member is disposed in its sensing region. In between each file item, the detector units are reset to be ready to read the next file item. Consequently, the file storage system enables a desired file item to be identified although all its metallic members may not be simultaneously detected by the detector units.

The present invention relates to a file storage system and more particularly relates to a file storage system capable of identifying stored file items therein.

In file storage systems, many file items such as documents, cards, or papers, are systematically arranged in storage devices. At times, it is desirable to retrieve certain of the stored file items for temporary use and then replace them in the storage device. If a file storage system is used for arranging numerous items and if frequent temporary use is made of the stored items, then the process of locating the stored items becomes burdensome, and extraordinary care has to be taken to prevent and correct misplacement of the temporary used file items.

The file storage system incorporating the present invention includes a plurality of aligned detector units having metallic sensing regions spaced at preselected intervals. Each detector unit normally operates in a first state of operation and changes to another state of operation after a metallic member passes its sensing region. File items are provided wtih identification means having one or more aligned metallic members. The identification means of each file item may have metallic members arranged to represent an identifying number in binary form. After the identification means of each file item is moved by the detector units, an interval termination signal is produced to reset the detector units to their first states of operation preparing them to read the identification means of a subsequent file item. Common means are also provided including a plurality of switches capable of being selectively connected to the detector units to develop a coincident signal for a predetermined arrangement of the metallic members of the identifying means. When a coincident signal exists during an interval termination signal, the system develops a file item identifying signal.

It is therefore an object of this invention to provide a file storage system for identifying its stored film items.

Another object of this invention is to provide a file storage system wherein each file item has an identification means with identifying information in binary form.

An additional object of this invention is to provide a file storage system wherein each file item has an identification means with identifying information in binary form, and which includes means for quickly reading the identifying information of each file item.

A further object of this invention is to provide a file storage system having detector units to accurately read the identifying information of each file unit passing in the proximity of the detector units without making physical contact therewith.

A still further object of this invention is to provide a file storage system wherein file items may be stored at random, and which includes detector units to accurately read the identifying information of each file item.

Still another object of this invention is to provide a file storage system wherein one or more of randomly placed files can be accurately quickly detected and selected.

Another object of this invention is to provide a file storage system having a plurality of aligned detector units having metallic member sensing regions to provide an identifying signal for a predetermined arrangement of metallic members wherein all the metallic members may not be simultaneously detected by the detector units.

Still another object of this invention is to provide a detector unit for an identifying system which reacts to a metallic member passing in the proximity thereof to change its operating state.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
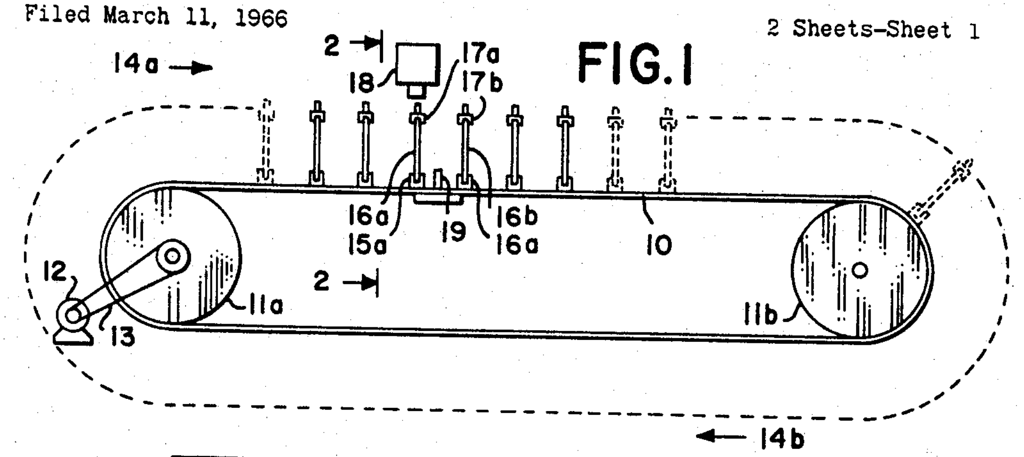
FIG. 1 is a side view of a file storage system incorporating this invention.

Referring now to the figures, there is seen in FIG. 1 a side view of a file storage system incorporating this invention. An endless belt 10 is shown carried by pulleys **11*a* and 11*b*. An electric motor 12 is connected to rotate pulley 11*a* by belt drive belt 13 in order to move endless belt 10 around pulleys 11*a* and 11*b* in the direction shown by arrows 14*a* and 14*b*. A plurality of identical card holders, such as card holders 15*a* and 15*b*, are attached to the outer surface of belt 10. The card holders are seen to be spaced at approximate equal intervals along the circumference of belt 10. Each card holder carries a file item with an identification means such as file item 16*a* with identification means 17*a* in card holder 15*a*. A casing 18 for detector units is seen fixedly positioned above identification means 17*a*. A switch 19 is fixedly positioned approximately half-way between file items 16*a* and 16*b* when file item 16*a* is under casing 18** as seen in FIG. 1.

Figure 2:
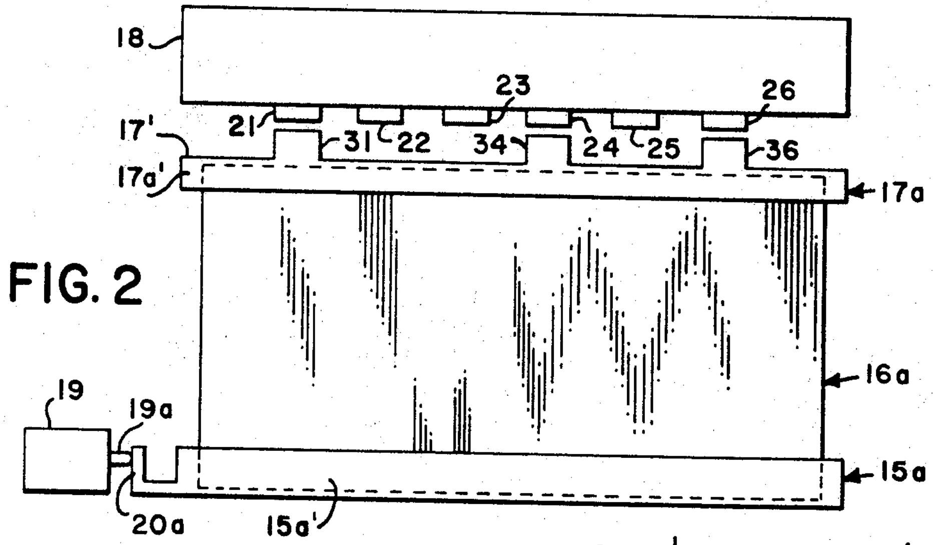
FIG. 2 is an enlarged view seen along lines 2—2 of FIG. 1 showing one of the file items with an attached identification means positioned under several detector units.

In FIG. 2 there is seen an enlarged view seen along lines 2—2 of FIG. 1 showing casing 18 with six identical transducer heads 21, 22, 23, 24, 25, and 26. Transducer heads 21 through 26 are aligned at approximately equally spaced intervals.

Figure 3:
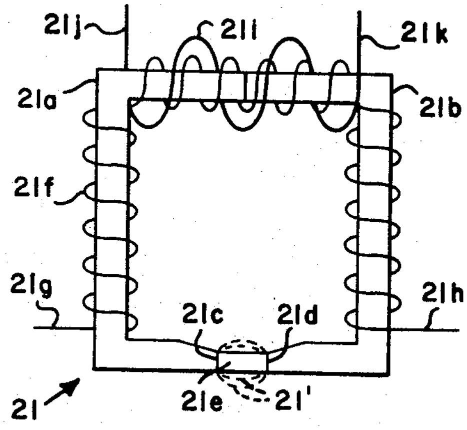
FIG. 3 is an enlarged showing of a side view of one of the magnetic transducer heads of the detector units seen in FIG. 2.

An enlarged showing of a side view of transducer head 21 (which is typical of the other transducer heads) is seen in FIG. 3. Transducer head 21 includes a magnetic core with core sections 21*a* and 21*b* having extremities forming end faces 21*c* and 21*d* defining a non-magnetic operating gap therebetween, within which a non-magnetic spacer 21*e* is inserted. Inductance coil 21*f* which leads 21*g* and 21*h* and inductance coil 21*i* which leads 21*j* and 21*k* are both wound on said magnetic core to be inductively coupled to each other. Coils 21*f* and 21*i* are wound in the same direction and are symmetrically arranged with respect to the non-magnetic gap. When current flows in coils 21*i* and 21*f*, electromagnetic lines of flux are developed in core sections 21*a* and 21*b* which pass through the non-magnetic gap between end faces 21*c* and 21*d*. As is well known, these lines of flux spread in the space between end faces 21*c* and 21*d* as indicated by lines 21' seen in FIG. 3 to form a metallic sensing region. If a metallic member made of iron, aluminum, etc., is placed in the space indicated by lines 21', then eddy currents will be induced in the metallic member to effectively reduce the magnetic coupling between coils 21*i* and 21*f*. For an oscillating frequency of about 50 kilocycles as hereinafter stated in reference to the circuit diagram of FIG. 5, a metallic member made of ferrous material has been found to be preferable. Even though such a ferrous material is not a very good electrical conductor, it enables more electromagnetic flux to pass therethrough making the operation of the detector units more sensitive. A metallic member may be stated to be in the metallic sensing region of transducer head 21 when it is positioned within the space indicated by lines 21', to reduce the magnetic coupling between coils 21*i* and 21*f* in a certain desired amount.

Figure 4:
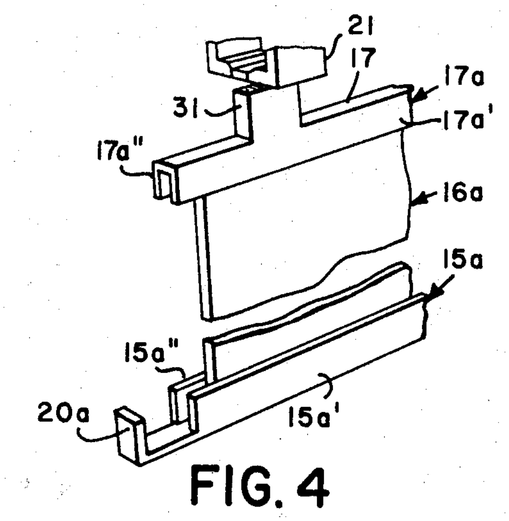
FIG. 4 is a partial perspective view of the file item seen in FIG. 2 with an attached metallic member and its associated transducer head.

Referring now again to FIG. 2, there is also seen therein card holder 15*a* with an inserted file item 16*a* carrying its identification means 17*a*, and switch 19. As also seen in FIG. 4, card holder 15*a* has two opposite sides 15*a'* and 15*a''* resiliently joined at one edge to normally press against each other forming an elongated clasp or fastener. A vertical flange 20*a* extends from one end of card holder 15*a*. Switch 19 is normally open and has a push-button 19*a* actuable by flange 20*a* to be pushed in to close switch 19. File item 16*a*, which is typical of the other illustrated file items, is seen to be a rectangular shaped card which may have certain desired information printed or written thereon. The bottom edge of file item 16*a* is inserted between sides 15*a'* and 15*a''* of card holder 15*a* to be retained thereby in a vertical position as shown. Indentification means 17*a* includes opposite sides 17*a'* and 17*a''* resiliently joined at edge 17' to normally press against each other forming an elongated clasp or fastener. With the top edge of file item 16*a* inserted between sides 17*a'* and 17*a''*, identification means 17*a* is attached to file item 16*a* and thereby carried by it. Three aligned metallic members 31, 34, and 36 are also seen to extend from edge 17' of identification means 17*a* to be close to although not in physical contact with correspondingly positioned transducer heads 21, 24 and 26, respectively. As seen in FIGS. 2 and 4, the width of each metallic member approximates the width of the core of each transducer head, and the thickness of each metallic member approximates the thickness of the non-magnetic gap of each transducer head.

Figure 5:
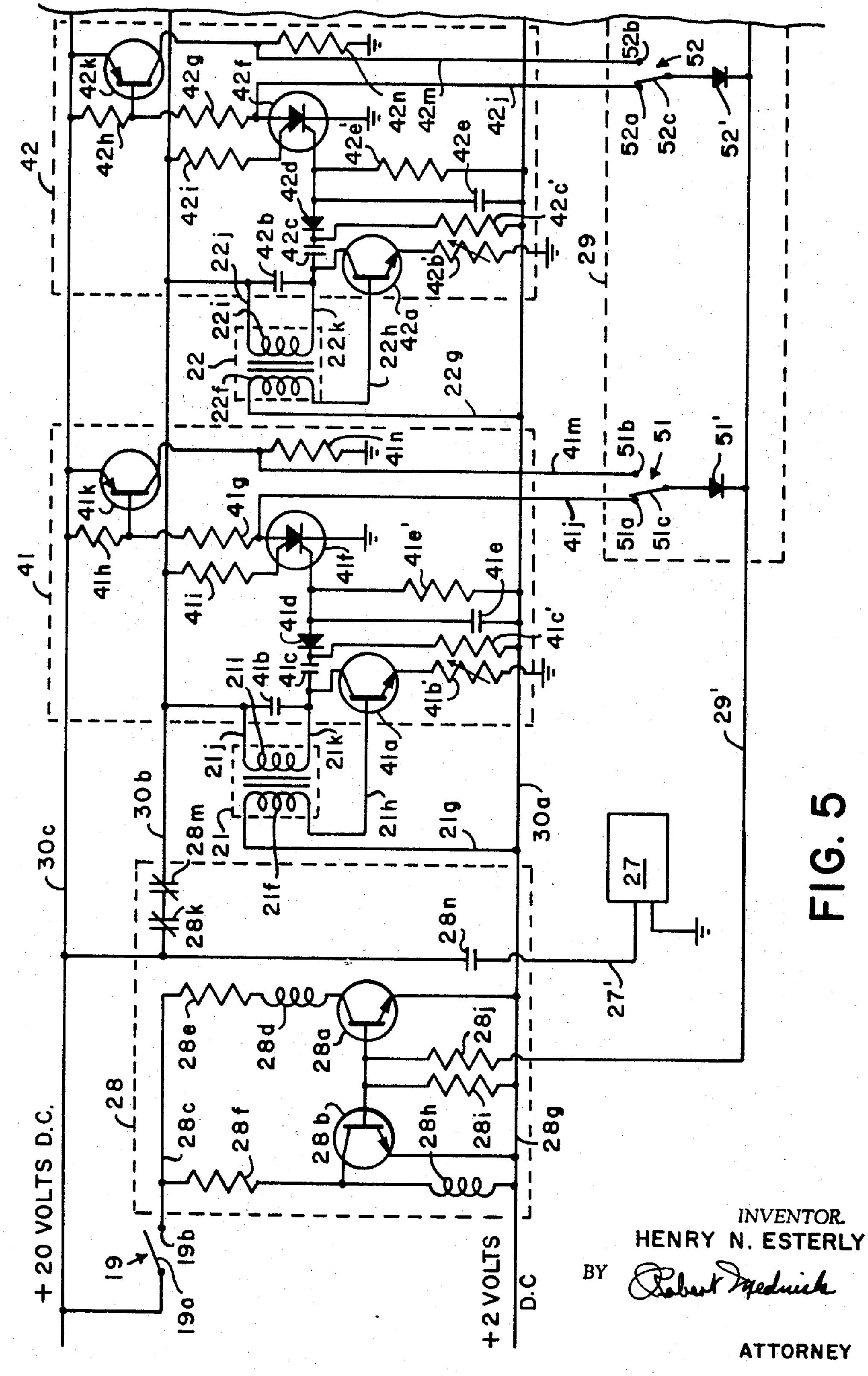
FIG. 5 is a schematic circuit diagram of the electronics utilized in the system of the described embodiment.

Referring now to FIG. 5 which shows a schematic circuit diagram of the electronics utilized in the system of the described embodiment, there is seen switch 19, indicating device 27, circuit 28, the schematic electrical equivalents of transducer heads 21 and 22, circuits 41 and 42 associated with transducer heads 21 and 22, and circuit 29. All of the electronics of FIG. 5 is contained within casing 18.

Circuit 41 includes a transistor 41*a* connected to operate as an oscillator. Lines 21*h* and 21*g* of coil 21*f* of transducer head 21 connect to the base of transducer 41*a* and to a +2 volt D.C. line 30*a*, respectively. Lines 21*k* and 21*j* of coil 21*i* of transducer head 21 connect to the collector of transistor 41*a* and to common line

30*b* respectively. Capacitor 41*b* across coil 21*i* provides a tuned circuit for the frequency of oscillations which may be about 50 kilocycles. The base of transistor 41*a* receives a forward bias of +2 volts D.C. by being connected to line 30*a* through coil 21*f*. The emitter of transistor 41*a* connects to ground through resistor 41*b'* which can be varied to control the level of oscillations. During the absence of a metallic member such as metallic member 31 in the proximity of the non-magnetic gap of transducer head, the regenerative signal induced in coil 21*f* by coil 21*i* causes transistor 41*a* to oscillate. The alternating excursions of the oscillations taken from the collector of transistor 41*a* are coupled by capacitor 41*c* to appear across resistor 41*c'*. The negative excursions of these oscillations pass through diode 41*d* to be filtered by capacitor 41*e* in order to develop a negative bias on the cathode gate of silicon controlled switch transistor 41*f*.

As for transistor 41*f*, its cathode conects to ground, its anode connects to +20 volt D.C. line 30*c* through resistors 41*g* and 41*h*, and its anode gate connects to line 30*b* through resistor 41*i*. When transistor 41*a* is oscillating, the negative bias maintained on the cathode gate of transistor 41*f* prevents it from conducting. In that event, the voltage on line 41*j* connected to the anode of transistor 41*f* will be at +20 volts D.C., and circuit 41 will be in its first state of operation as herein referred to. If the oscillations should be interrupted, then the negative bias voltage on capacitor 41*e* will discharge through resistor 41*e'* causing the voltage on the cathode gate of transistor 41*f* to rise to +2 volts. Transistor 41*f* will thereupon be fired and conduct. If oscillations should thereafter continue, transistor 41*f* will not as a result thereof be reset to operate in its first state of operation, but it will continue to conduct. After transistor 41*f* has been fired, the voltage on line 41*j* connected to the anode of transistor 41*f* will be near zero volt or effectively at zero volt, and circuit 41 will be in its second state of operation as herein referred to. Accordingly, the presence of +20 volts D.C. on line 41*j* indicates that transistor 41*f* has been caused to be non-conducting and at all times since then has been provided with a negative bias at its cathode gate to maintain its non-conducting state. If the voltage on line 41*j* is at zero, an interruption of the oscillations developed by transistor 41*a* has occurred.

In addition, transistor 41*k* is provided in circuit 41 which has its collector connected to ground through resistor 41*n*, its emitter connected to line 30*c*, and its base connected to the junction of resistors 41*g* and 41*h*. When the base of transistor 41*k* is at +20 volts D.C., i.e. when transistor 41*f* is not conducting, then neither will transistor 41*k* conduct, and the voltage on line 41*m* from load resistor 41*n* will be at zero volt. On the other hand, when transistor 41*f* conducts, then the positive voltage at the base of transistor 41*k* is reduced to allow transistor 41*k* to conduct thereby developing a voltage on line 41*m* that is approximately +20 volts D.C. Accordingly, it will be realized that the voltages on lines 41*j* and 41*m* will be the reverse of each other, i.e. when line 41*j* is at +20 volts then line 41*m* will be at zero volt, and vice versa.

The combination of transducer head 21 and its associated circuit 41 form a detector unit as herein referred to. Transducer head 21 is connected to circuit 41 so that its transistor 41*a* oscillates as above described as long as a metallic member such as metallic member 31 is not in its sensing region. When such a metallic member is so disposed, then a sufficient amount of magnetic decoupling between coils 21*i* and 21*f* of transducer head 21 results to cause a cessation of said oscillations. By way of example, the transistors of circuit 41 may be of the following types commonly designated by manufacturers thereof, to-wit: transistor 41*a* as type 2N3565, transistor 41*f* as type 3N58, and transistor 41*k* as type 2N404.

As is the case for transducer heads 21 and 22, circuit 42 is also seen to be identical to circuit 41 and corresponding parts thereof have the numeral designation of said circuit together with the corresponding letter designations of circuit 41. The combination of transducer head 22 with its associated circuit 42 form another detector unit. Although not shown in the drawings, circuits identical to circuits 41 and 42 are provided to be associated with transducer heads 23, 24, 25 and 26 to form other detector units therewith, each of these circuits are connected in the same manner to its associated transducer head and to lines 30*a*, 30*b*, and 30*c*, as seen in FIG. 5 for circuits 41 and 42. In addition, each of the circuits for transducer heads 23 through 26 have a pair of lines extending to circuit 29, such as lines 41*j* and 41*m* for circuit 41 and lines 42*j* and 42*m* for circuit 42.

In circuit 29, lines 41*j* and 41*m* connect to terminals 51*a* and 51*b* of switch 51. Movable arm 51*c* of switch 51 is connectable to either one of terminals 51*a* and 51*b* and connects to common line 29' through diode 51'. In addition, lines 42*j* and 42*m* connect to terminals 52*a* and 52*b* of switch 52. Movable arm 52*c* of switch 52 is connectable to either one of terminals 52*a* and 52*b* and connects to common line 29' through diode 52'. Furthermore, each of the pair of similar lines from the circuits associated with transducer heads 23 through 26 connect to a switch and diode to common line 29' in circuit 29, in an identical manner as above described for lines 41*j* and 41*m* of circuit 41 as well as for lines 42*j* and 42*m* of circuit 42.

Each of the diodes of circuit 29 act to electrically decouple any positive voltage on common line 29' from its connected circuit associated with each transducer head. For example, if circuit 41 is in its first state of operation and movable arm 51*c* is set to contact terminal 51*b*, any positive voltage on line 29' will not be able to pass through diode 51' to line 41*m* which is at zero volt. On the other hand, if circuit 41 is in its second state of operation and movable arm 51*c* is set to contact terminal 51*a*, the positive voltage on line 29' will not be able to pass through diode 51' to line 41*j* which is at zero volt. All of the other diodes of circuit 29 operate in the same manner.

The movable arms of the switches in circuit 29 can be set to contact either one of its pair of terminals in any desired predetermined arrangement. Accordingly, it will be realized that if any of the movable arms of the switches of circuit 29 connect to a line having +20 volts thereon, then common line 29' will also have +20 volts thereon. Also, it will be realized that only if all of the movable arms of the switches of circuit 29 are connected to lines having zero volt thereon, then common line 29' will have zero volt thereon. In the latter event, it can be stated that the states of operation of all the detector units coincide with the setting of the switches of circuit 29. Therefore, circuit 29 provides a common means capable of being connected to the detector units to produce a coincident signal when the detector units are in their first and second states of operation in a predetermined arrangement. In this case the coincident signal happens to be the condition of zero volt on common line 29'.

Circuit 28 is seen to include transistors 28*a* and 28*b*. The collector of transistor 28*a* connects to line 28*c* through relay coil 28*d* and resistor 28*e*. The collector of transistor 28*b* connects to line 28*c* through resistor 28*f* and connects to line 28*g* through relay coil 28*h*. Line 28*g* connects to line 30*a*. The emitters of transistors 28*a* and 28*b* are connected to line 28*g*. The bases of transistors 28*a* and 28*b* are connected to each other and to line 28*g* through resistor 28*i* and to line 29' through resistor 28*j*.

Switch 19 has a pushbutton represented by movable arm 19*a* which connects to the +20 volts D.C. on line 30*c*, and has a terminal 19*b* connected to line 28*c* of circuit 28. Switch 19 is normally open as shown in FIG. 5. Upon pushbutton 19*a* being depressed by the flange of each cardholder such as flange 20*a* of card holder 15*a* seen in FIG. 2, then movable arm 19*a* is caused to contact terminal 19*b*. Thereupon, the voltage on line 30*c* is applied to line 28*c* to activate circuit 28. When circuit 28 is so activated, then if line 29' is at +20 volts, transistor 28*b* will conduct to effectively short relay coil 28*h* preventing it from being energized and transistor 28*a* will also conduct to allow relay coil 28*d* to be energized. When relay coil 28*d* is energized, its contactors 28*k* which are normally closed as seen in FIG. 5 are thereupon opened. In addition, with circuit 28 activated, if line 29' is at zero volt, then both transistors 28*a* and 28*b* will remain non-conducting and relay coil 28*h* will thereupon be energized. When relay coil 28*h* is energized, its pair of conductors 28*m* and 28*n* are respectively opened and closed, the reverse of that seen in FIG. 5 which therein represents the condition when relay coil 28*h* is not energized.

Each time that switch 19 is closed, either relay coil 28*d* or relay coil 28*h* is energized causing either contactor 28*k* or 28*m* to be opened to remove the +20 volts on line 30*c* from line 30*b*. When the voltage is removed from line 30*b*, all the silicon controlled switch transistors (such as transistors 41*f* and 42*f*) will be extinguished, i.e. caused to be non-conducting. Accordingly, each time that switch 19 is closed, all the detector units are reset to operate in their stated first state of operation. In addition, whenever relay coil 28*h* is energized, the voltage on line 30*c* will also be applied through the then closed contactors 28*n* via line 27' to indicating device 27. Indicating device may be any devices responsive to the presence of the said voltage on line 27' to give any desired indication thereof.

In operation, motor 12 drives endless belt 10 around pulleys 11*a* and 11*b* to transversely move the file items with respect to the detector units. Eeach time a file item passes the detector units, switch 19 (the interval indication means) operates to apply a +20 volt pulse (the interval termination signal) to activate circuit 28 during this pulse. Circuit 28 is the interval responsive means which receives the +20 volt pulses to reset all the detector units to operate in their first states of operation. As each succeeding file item passes the detector units, its identification means with its metallic members will cause certain of the detector units to operate in their second states of operation. Accordingly, the combination of detector units read the arrangement of metallic members of each identification means. Thereafter, circuit 28 resets the detector units to enable them to again read the identification means of the next file item. When the arrangement of the metallic members correspond with the settings of the switches in common means 29, common means 29 will produce a coincident signal. Circuit 28 is also responsive to this coincident signal to provide a file item identifying signal when the coincident signal exists during the interval termination signal. Accordingly, the file items will be moved on endless belt 10 until the desired file item has been located as determined by the presence of the file item identifying signal.

As circuit 28 only operates during the existence of an interval termination signal from switch 19, perfect alignment of the file items and their identfication means is not necessary for proper identification thereof in the system of this invention. The operation of circuit 28 is made to wait until each identification means has passed the detector units before producing a file item identifying signal. Accordingly, not all of the metallic members of each file itme identification means need to be simultaneously detected by the combination of detector units. Circuit 28 prevents errors in identification due to such misalignment and therefore enables accurate identification of the file times in the system of this invention.

If desired, the identification means can have its metallic members arranged to represent a binary number. If the presence of a metallic member in alignment with a corresponding detector unit is considered to be number 1 in binary form, and the absence thereof considered to be zero, then the identification means 17*a* of FIG. 2 bears 100101 in binary form, if it is read from left to right as seen in FIG. 2. Each file item can have another arrangement of aligned metallic members, the different combinations thereof representing different identification numbers in binary form. It will also be realized that any number of detector units may be used with file items having identification means with metallic members in correspondingly aligned positions. Moreover, the file items utilized in the system of this invention can be of any shape or form, as long as its identification means coact with the detector units substantially as described.

Having described the invention, what is claimed as new is:

1. A file storage system comprising:

a plurality of spaced file items, each file item having an identification means including one or more metallic members;

a plurality of detector units, each detector unit having a metallic sensing region, and each detector unit having a first state of operation and changing to operate in a second state of operation after a metallic member is disposed in its sensing region;

means to move the file items with respect to the detector units to cause each metallic member of an identification means to pass through the sensing region of one of the detector units during a separate time interval;

a common means capable of being connected to the detector units to produce a coincident signal when the detector units are in their first and second states of operation in a predetermined arrangement;

an interval indication means operable after each file item passes the detector units to produce an interval termination signal; and an interval responsive means responsive to each interval termination signal to reset the detector units causing all of them to operate in their first states of operation, and to produce a file item identifying signal when a coincident signal exists during an interval termination signal.

2. The file storage system defined in claim 1 wherein each detector unit includes a transducer head having a magnetic core with a non-magnetic gap forming a metallic sensing region, and having a first coil and a second coil wound on said magnetic core; an amplifier connected to said first and second coils to amplify a signal induced in the first coil and develop a regenerative signal in the second coil, the first and second coils being coupled to each other to cause the amplifier to oscillate, and to be responsive to the presence of a metallic member in its metallic sensing region to cause the amplifier to cease oscillating; and a detector circuit connected to the amplifier to provide one signal when the amplifier continues to oscillate during each of said intervals, and to provide another signal after the amplifier has ceased oscillating during each of said intervals.

3. A file storage system comprising:

a plurality of spaced file items, each file item having an identification means including one or more metallic members;

a plurality of detector units, each detector unit having a metallic sensing region, and each detector unit having a first state of operation and changing to operate in a second state of operation after a metallic member is disposed in its sensing region;

a common means capable of being connected to the detector units to produce a coincident signal when the detector units are in their first and second states of operation in a predetermined arrangement;

an interval indication means operable after each file item passes the detector units to produce an interval termination signal;

means to move the file items with respect to the detector units to cause each metallic member of an identification means to pass through the sensing region of one of the detector units in between interval termination signals; and an interval responsive means responsive to each interval termination signal to reset the detector units causing all of them to operate in their first states of operation, and to produce a file item identifying signal when a coincident signal exists during an interval termination signal.

4. The file storage system defined in claim 3 wherein each detector unit includes a transducer head having a magnetic core with a non-magnetic gap forming a metallic sensing region, and having a first coil and a second coil wound on said magnetic core; an amplifier connected to said first and second coils to amplify a signal induced in the first coil and develop a regenerative signal in the second coil, the first and second coils being coupled to each other to cause the amplifier to oscillate, and to be responsive to the presence of a metallic member in its metallic sensing region to cause the amplifier to cease oscillating; and a detector circuit connected to the amplifier to provide one signal when the amplifier continues to oscillate in between interval termination signals, and to provide another signal after the amplifier has ceased oscillating in between interval termination signals.

5. A file storage system comprising: a plurality of file items, each file item having an identification means including one or more aligned metallic members; a plurality of detector units, each detector unit having a metallic sensing region, each detector unit having a first state of operation and changing to operate in a second state of operation after a metallic member is disposed in its sensing region; and means to move the file items with respect to the detector units to cause each metallic member of an identification means to pass through the sensing region of one of the detector units during a separate time interval, wherein each detector unit includes a transducer head having a magnetic core with a non-magnetic gap forming a metallic sensing region, and having a first coil and a second coil wound on said magnetic core; an amplifier connected to said first and second coils to amplify a signal induced in the first coil and develop a regenerative signal in the second coil, the first and second coils being coupled to each other to cause the amplifier to oscillate, and to be responsive to the presence of a metallic member in its metallic sensing region to cause the amplifier to cease oscillating; and a detector circuit connected to the amplifier to provide one signal when the amplifier continues to oscillate during each of said intervals, and to provide another signal after the amplifier has ceased oscillating during each of said intervals.

6. A file storage system comprising: a plurality of file items, each file item having an identification means including one or more aligned metallic members; a plurality of aligned detector units positioned to be substantially parallel with the aligned metallic members of each identification means, each detector unit having a metallic sensing region, and each detector unit having a first state of operation and changing to operate in a second state of operation after a metallic member is disposed in its sensing region; and means to move the file items with respect to the detector units to cause each metallic member of an identification means to pass through the sensing region of one of the detector units during a separate time interval, wherein each detector unit includes a transducer head having a magnetic core with extremities terminating in end faces in apposition to each other defining a non-magnetic gap forming a metallic sensing region, and having a first coil and a second coil wound on said magnetic core; an amplifier connected to said first and second coils to amplify a signal induced in the first coil and develop a regenerative signal in the second coil, the first and second coils being coupled to each other to cause the amplifier to oscillate, and to be responsive to the presence of a metallic member in its sensing region to cause the amplifier to cease oscillating; and a detector circuit connected to the amplifier to provide one signal when the amplifier continues to oscillate during each of said intervals, and to provide another signal after the amplifier has ceased oscillating during each of said intervals.

7. An identifying system comprising: a transducer head having a magnetic core with a non-magnetic gap forming a metallic sensing region, and having a first coil and a second coil wound on said magnetic core to be responsive to the presence of a metallic member in the metallic sensing region to change the magnetic coupling between said coils; an amplifier connected to said first and second coils to amplify a signal induced in the first coil and develop a regenerative signal in the second coil; and a detector circuit connected to the amplifier to provide one signal when the amplifier oscillates during a time interval, and to provide another signal when the amplifier does not oscillate during said time interval.

8. An identifying system comprising: a transducer head having a magnetic core with extremities terminating in end faces in apposition to each other defining a non-magnetic gap forming a metallic sensing region, and having a first coil and a second coil wound on said magnetic core; an amplifier connected to said first and second coils to amplify a signal induced in the first coil and develop a regenerative signal in the second coil, the first and second coils being coupled to each other to cause the amplifier to oscillate, and to be responsive to the presence of a metallic member in its metallic sensing region to cause the amplifier to cease oscillating; and a detector circuit connected to the amplifier to provide one signal when the amplifier continues to oscillate during a time interval, and to provide another signal after the amplifier has ceased oscillating during said time interval.

References Cited

UNITED STATES PATENTS

| | | | |
|---|---|---|---|
| 3,307,162 | 2/1967 | Fink | 340—174.1 |
| 3,034,643 | 5/1962 | Keller et al. | 340—174.1 |
| 3,215,820 | 11/1965 | Heard | 235—61.11 |

BERNARD KONICK, *Primary Examiner.*

A. I. NEUSTADT, *Assistant Examiner.*